(12) United States Patent
Bian et al.

(10) Patent No.: US 11,703,641 B2
(45) Date of Patent: Jul. 18, 2023

(54) WAVELENGTH DIVISION MULTIPLEXING FILTERS INCLUDING A SUBWAVELENGTH GRATING

(71) Applicant: GLOBALFOUNDRIES U.S. Inc., Malta, NY (US)

(72) Inventors: Yusheng Bian, Ballston Lake, NY (US); Francis Afzal, Nashville, TN (US)

(73) Assignee: GlobalFoundries U.S. Inc., Malta, NY (US)

( * ) Notice: Subject to any disclaimer, the term of this patent is extended or adjusted under 35 U.S.C. 154(b) by 67 days.

(21) Appl. No.: 17/510,910

(22) Filed: Oct. 26, 2021

(65) Prior Publication Data
US 2023/0128725 A1    Apr. 27, 2023

(51) Int. Cl.
| | | |
|---|---|---|
| G02B 6/12 | (2006.01) | |
| G02B 6/122 | (2006.01) | |
| G02B 6/13 | (2006.01) | |
| G02B 6/293 | (2006.01) | |

(52) U.S. Cl.
CPC ....... *G02B 6/12007* (2013.01); *G02B 6/1228* (2013.01); *G02B 6/13* (2013.01); *G02B 6/2938* (2013.01)

(58) Field of Classification Search
CPC .... G02B 6/12; G02B 6/12007; G02B 6/1228; G02B 6/13; G02B 6/2938
See application file for complete search history.

(56) References Cited

U.S. PATENT DOCUMENTS

| | | |
|---|---|---|
| 6,876,793 B1 | 4/2005 | Ling et al. |
| 10,816,726 B1 | 10/2020 | Peng et al. |
| 2019/0317282 A1* | 10/2019 | Cho ............... G02B 6/12004 |

OTHER PUBLICATIONS

Y. Bian et al., "Monolithically integrated silicon nitride platform," 2021 Optical Fiber Communications Conference and Exhibition (OFC), 2021, pp. 1-3.
Shuren Hu et al., "Grating-Based Filters for Photonics Applications", filed Nov. 13, 2019 as U.S. Appl. No. 16/682,354.
Alec Hammond et al., "Perforated Wavelength-Dmsion Multiplexing Filters", filed Feb. 8, 2021 as U.S. Appl. No. 17/170,203.
B. Naghdi and L. R. Chen, "Silicon Photonic Four-Channel Optical Add-Drop Multiplexer Enabled by Subwavelength Grating Waveguides," in IEEE Photonics Journal, vol. 10, No. 4, pp. 1-10, Aug. 2018, Art No. 6601510.

(Continued)

*Primary Examiner* — Tina M Wong
(74) *Attorney, Agent, or Firm* — Thompson Hine LLP; Anthony Canale (57) ABSTRACT

Structures for a wavelength division multiplexing filter and methods of fabricating a structure for a wavelength division multiplexing filter. The structure includes a first waveguide core having a first section and a second section. The first section and the second section have a first notched sidewall and a second notched sidewall opposite to the first notched sidewall. The structure further includes a second waveguide core positioned with a first offset in a first direction relative to the first section and the second section of the first waveguide core and with a second offset in a second direction relative to the first section and the second section of the first waveguide core. The second direction is transverse to the first direction.

20 Claims, 9 Drawing Sheets

(56) References Cited

OTHER PUBLICATIONS

Behnam Naghdi and Lawrence R. Chen, "Silicon photonic contradirectional couplers using subwavelength grating waveguides," Opt. Express 24, 23429-23438 (2016).

B. Liu, Y. Zhang, Y. He, X. Jiang, C. Qiu and Y. Su, "High-suppression-ratio silicon bandpass fitter using apodized subwavelength grating coupler," 2017 Conference on Lasers and Electro-Optics Pacific Rim (CLEO-PR), 2017, pp. 1-2.

Wei Shi, Han Yun, Charlie Lin, Mark Greenberg, Xu Wang, Yun Wang, Sahba Talebi Fard, Jonas Flueckiger, Nicolas A. F. Jaeger, and Lukas Chrostowski, "Ultra-compact, flat-top demultiplexer using anti-iellection contra-directional couplers for CWDM networks on silicon," Opt. Express 21, 6733-6738 (2013).

F. O. Afzal et al., "Band Subwavelength Grating Filters in a Monolithic Photonics Technology," in IEEE Photonics Technology Letters, vol. 32, No. 18, pp. 1207-1210, 15 Sep. 15, 2020.

Y. Bian, J. Ayala, C. Meagner, B. Peng, M. Kakowski, A. Jacob, K. Nummy, A. Stricker, Z. Sowinski, A. Sahin, A. Aboketaf, S. Hu, I. Stobert, K. Mclean, L. Medina, K. Dezfulian, B. Harris, S. Krishnamurthy, T. Houghton, W. S. Lee, M. Sorbara, D. Riggs, T. Letavic, A. Yu, K. Giewont, and J. Pellerin, "Towards low-loss monolithic silicon and nitride photonic building blocks in state-of-the-art 300mm CMOS foundry," in Frontiers in Optics / Laser Science, B. Lee, C. Mazzali, K. Corwin, and R. Jason Jones, eds., OSA Technical Digest (Optical Society of America, 2020).

K. Giewont et al., "300-mm Monolithic Silicon Photonics Foundry Technology," in IEEE Journal of Selected Topics in Quantum Electronics, vol. 25, No. 5, pp. 1-11, Sep.-Oct. 2019, Art No. 8200611.

M. Rakowski, C. Meagher, K. Nummy, A. Aboketal, J. Ayala, Y. Bian, B. Harris, K. Mclean, K. McStay, A. Sahin, L. Medina, B. Peng, Z. Sowinski, A. Stricker, T. Houghton, C. Hedges, K. Giewont, A. Jacob, T. Letavic, D. Riggs, A. Yu, and J. Pellerin, "45nm CMOS—Silicon Photonics Monolithic Technology (45CLO) for next-generation, low power and high speed optical interconnects," in Optical Fiber Communication Conference (OFC) 2020, OSA Technical Digest (Optical Society of America, 2020), paper T3H.3.

* cited by examiner

WAVELENGTH DIVISION MULTIPLEXING FILTERS INCLUDING A SUBWAVELENGTH GRATING

BACKGROUND

The present invention relates to photonics chips and, more specifically, to structures for a wavelength division multiplexing filter and methods of fabricating a structure for a wavelength division multiplexing filter.

Photonics chips are used in many applications and systems including, but not limited to, data communication systems and data computation systems. A photonics chip integrates optical components, such as waveguides, photodetectors, modulators, and optical power splitters, and electronic components, such as field-effect transistors, into a unified platform. Among other factors, layout area, cost, and operational overhead may be reduced by the integration of both types of components on the same chip.

Wavelength division multiplexing is a technology that multiplexes multiple data streams onto a single optical link. In a wavelength-division-multiplexing scheme, a set of data streams is encoded onto optical carrier signals with a different wavelength of light for each data stream. These optical carrier signals of the individual data streams are then combined (i.e., multiplexed) by the wavelength division multiplexing filters of a multiplexer, which has a dedicated input for the data stream of each wavelength and a single output at which the individual data streams that are combined into a single multi-wavelength data stream exit for further transport through a single optical link. At the receiver side of the optical link, a multiplexer including wavelength division multiplexing filters separates (i.e., demultiplexes) the optical carrier signals of the individual data streams and the separated optical carrier signals may be routed to corresponding photodetectors.

Designs for wavelength division multiplexing filters used in multiplexers and demultiplexers may suffer from various disadvantages, ranging from a large footprint, low fabrication tolerance, a lack of thermal stability, and/or less than desirable optical performance metrics, such as bandwidth, channel shape, and insertion loss or crosstalk. Wavelength division multiplexing filters fabricated exclusively from silicon may be particularly susceptible to some or all of these disadvantages.

Improved structures for a wavelength division multiplexing filter and methods of fabricating a structure for a wavelength division multiplexing filter are needed.

SUMMARY

In an embodiment of the invention, a structure for a wavelength division multiplexing filter is provided. The structure comprises a first waveguide core including a first section and a second section. The first section and the second section have a first notched sidewall and a second notched sidewall opposite to the first notched sidewall. The structure further comprises a second waveguide core positioned with a first offset in a first direction relative to the first section and the second section of the first waveguide core and with a second offset in a second direction relative to the first section and the second section of the first waveguide core. The second direction is transverse to the first direction.

In an embodiment of the invention, a method of forming a structure for a wavelength division multiplexing filter is provided. The method comprises forming a first waveguide core including a first section and a second section. The first section and the second section have a first notched sidewall and a second notched sidewall opposite to the first notched sidewall. The method further comprises forming a second waveguide core positioned with a first offset in a first direction relative to the first section and the second section of the first waveguide core and with a second offset in a second direction relative to the first section and the second section of the first waveguide core. The second direction is transverse to the first direction.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
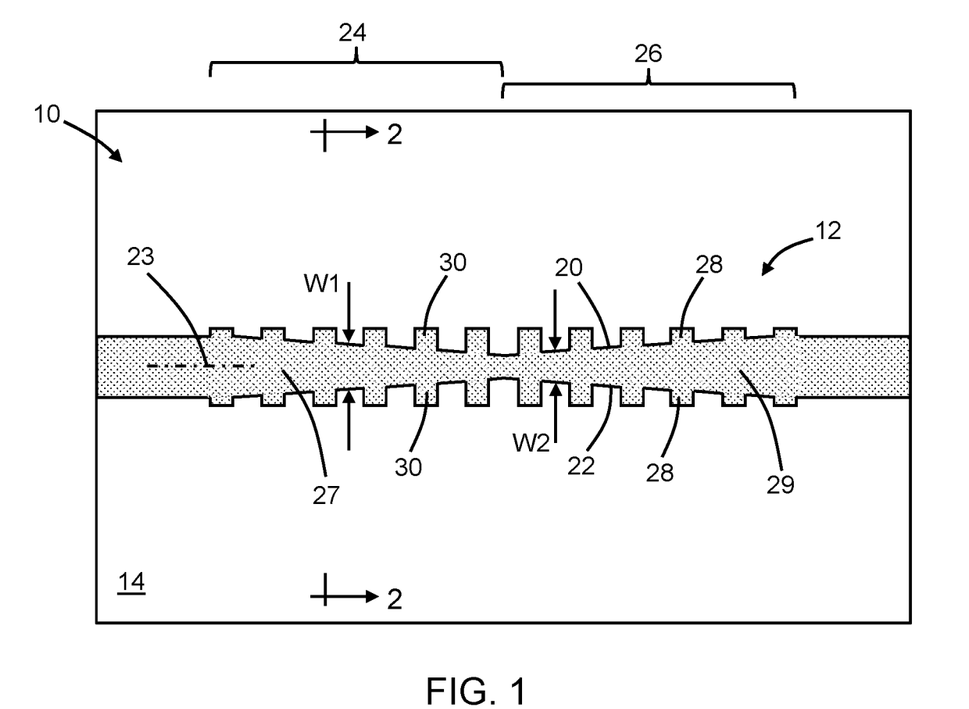
FIG. 1 is a top view of a structure at an initial fabrication stage of a processing method in accordance with embodiments of the invention.
Figure 2:
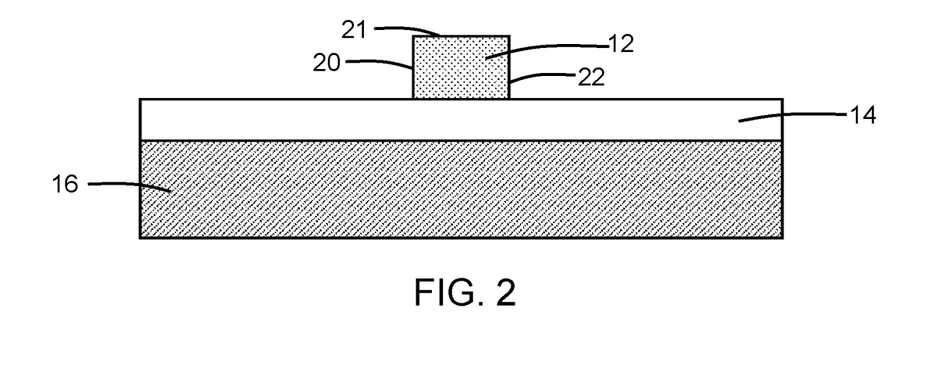
FIG. 2 is a cross-sectional view of the structure taken generally along line 2-2 in FIG. 1.

With reference to FIGS. 1, 2 and in accordance with embodiments of the invention, a structure 10 for a wavelength division multiplexing filter includes a waveguide core 12 that is positioned over a dielectric layer 14. The waveguide core 12 may be comprised of a high refractive-index material. In an embodiment, the waveguide core 12 may be comprised of a material having a refractive index in a range of 3 to 4. In an embodiment, the waveguide core 12 may be comprised of a semiconductor material, such as single-crystal silicon patterned by lithography and etching processes from a device layer of a silicon-on-insulator substrate. The silicon-on-insulator substrate further includes a buried insulator layer comprised of a dielectric material, such as silicon dioxide, that provides the dielectric layer 14 and a handle substrate 16 comprised of a single-crystal semiconductor material, such as single-crystal silicon, beneath the buried insulator layer. In an alternative embodiment, the waveguide core 12 may be patterned from the device layer by lithography and etching processes without etching fully through the device layer to form a thinned layer that is connected to the base of the waveguide core 12.

The waveguide core 12, which has opposite sidewalls 20, 22 and a top surface 21 connecting the sidewalls 20, 22, includes a section 24 and a section 26 that are arranged along a longitudinal axis 23 and that are adjoined to define a grating. The section 24 of the waveguide core 12 is a "fishbone" structure that includes a taper 27 and a series of projections 28 arranged as features along each of the opposite sidewalls 20, 22 to define a pair of notched sidewalls. In that regard, the sidewalls 20, 22 of the section 26 of the waveguide core 12 include indentations defining corrugations or notches between adjacent pairs of the projections 28. The taper 27, which is superimposed on the projections 28, has a varying width W1 along the longitudinal axis 23 such that the depth of the notches varies. The projections 28 are positioned in respective spaced arrangements along the sidewalls 20, 22 and extend outwardly from the taper 27 at each of the sidewalls 20, 22 in respective opposite lateral directions that are transverse to the longitudinal axis 23.

The section 26 of the waveguide core 12 is also a "fishbone" structure that includes a taper 29 and a series of projections 30 arranged as features along the taper 29 along each of the opposite sidewalls 20, 22 to define a pair of notched sidewalls. In that regard, the sidewalls 20, 22 of the section 26 include indentations or grooves defining notches between adjacent pairs of the projections 30. The taper 29, which is superimposed on the projections 30 and adjoined to the taper 27, has a varying width W2 along the longitudinal axis 23 such that the depth of the notches varies. The width W2 of the taper 29 tapers (i.e., narrows) in an opposite direction from the width W1 of the taper 27. The projections 30 are positioned in respective spaced arrangements along the sidewalls 20, 22 of the waveguide core 12 and extend outwardly from the taper 29 at each of the sidewalls 20, 22 in respective opposite directions that are transverse to the longitudinal axis 23.

The sections 24, 26 with the projections 28, 30 may effectively provide a subwavelength grating because the feature size of the projections 28, 30 may be smaller than the light wavelength. In an embodiment, the pitch and duty cycle of the projections 28 and/or the projections 30 may be uniform to define a periodic arrangement for the corrugations. In alternative embodiments, the pitch and/or the duty cycle of the projections 28 and/or the projections 30 may be apodized (i.e., non-uniform) to define a non-periodic arrangement for the corrugations. In an embodiment, the projections 28 and/or the projections 30 may have a rectangular patterned shape in a normal direction. In alternative embodiments, the projections 28 and/or the projections 30 may have a different patterned shape, such as an oval shape or a trapezoidal shape.

Figure 3:
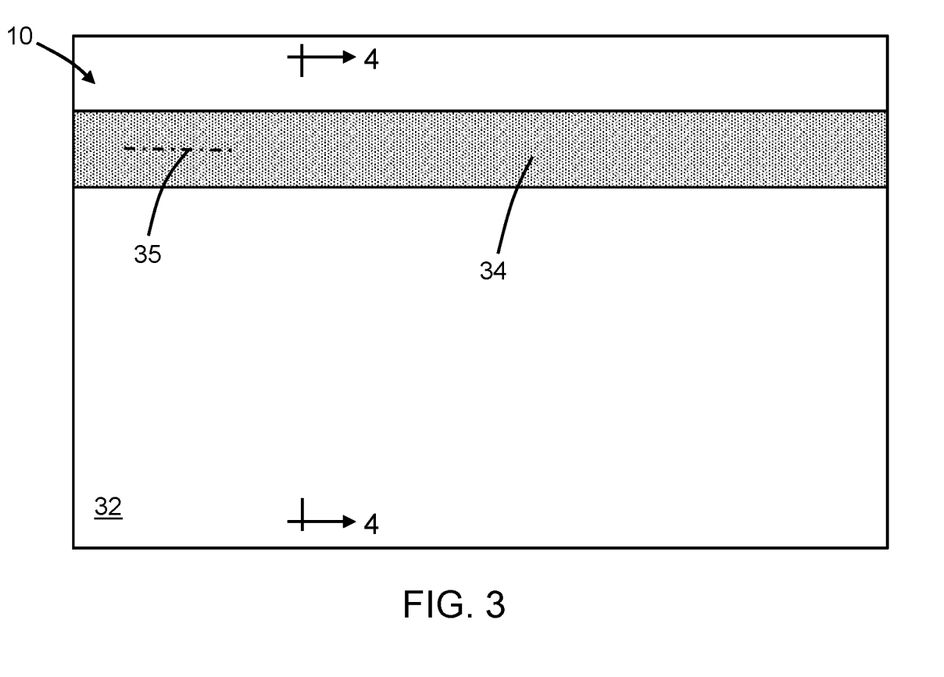
FIG. 3 is a top view of the structure at a fabrication stage of the processing method subsequent to FIG. 1.
Figure 4:
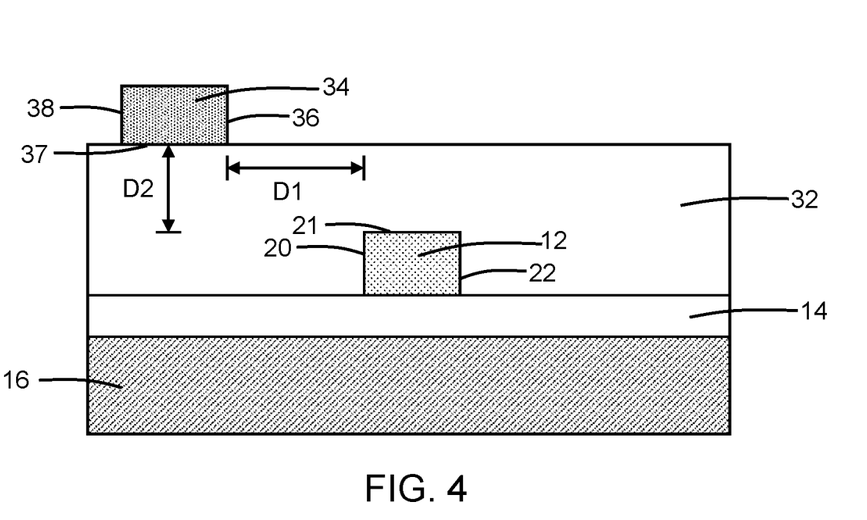
FIG. 4 is a cross-sectional view of the structure taken generally along line 4-4 in FIG. 3.

With reference to FIGS. 3, 4 in which like reference numerals refer to like features in FIGS. 1, 2 and at a subsequent fabrication stage, the dielectric layer 32 is formed over the waveguide core 12 and fills the spaces between the projections 28 and the projections 30. The dielectric layer 32 may be comprised of a dielectric material, such as silicon dioxide. The thickness of the dielectric layer 32 may be greater than the thickness of the waveguide core 12 such that the waveguide core 12 is embedded in the dielectric layer 32.

The projections 28, 30 and the dielectric material of dielectric layer 32 filling the spaces between the projections 28 and projections 30 may define metamaterial features in the structure 10. When the wavelength of the light propagating within the sections 24, 26 is greater than the feature size of the projections 28, 30, the projections 28, 30 and the dielectric layer 32 can be treated as an effective homogeneous material with an effective refractive index between the refractive index of the material constituting the sections 24, 26 and the refractive index of the dielectric material filling the spaces between the projections 28, 30.

A waveguide core 34 is formed on the dielectric layer 32. The waveguide core 34 may be comprised of a dielectric material, such as silicon nitride, having a different composition different than the composition of the dielectric layer 32. The waveguide core 34 may be patterned from a deposited layer of dielectric material by lithography and etching processes. The dielectric layer 32 is positioned in a vertical direction between the sections 24, 26 of the waveguide core 12 and the waveguide core 34. In alternative embodiments, the waveguide core 34 may be comprised of a different dielectric material, such as silicon oxynitride or aluminum nitride, than silicon nitride. In an alternative embodiment, the waveguide core 34 may be patterned from the deposited layer by lithography and etching processes without etching fully through the deposited layer to form a thinned layer that is connected to the base of the waveguide core 34 to define a ribbed waveguide core.

The waveguide core 34 may provide a bus waveguide that lacks a grating. The waveguide core 34 includes opposite sidewalls 36, 38 and a bottom surface 37 positioned on the dielectric layer 32, and the waveguide core 34 may extend along a longitudinal axis 35 that is parallel to the longitudinal axis 23 of the waveguide core 12. The waveguide core 34 is positioned relative to the sections 24, 26 of the waveguide core 12 with a lateral offset D1 in a lateral direction and a vertical offset D2 in a vertical direction that is transverse to the lateral direction. The waveguide core 34 may have a constant width dimension when adjacent to the sections 24, 26 of the waveguide core 12. The lateral offset D1 may be measured between the sidewall 36 of the waveguide core 34 that is closest to sidewall 20 of the waveguide core 12. The vertical offset D2 may be measured between the bottom surface 37 of the waveguide core 34 and the top surface 21 of the waveguide core 12. During use, light may be evanescently coupled between the grating defined by the sections 24, 26 of the waveguide core 12 and the bus waveguide defined by the waveguide core 34.

Figure 5:
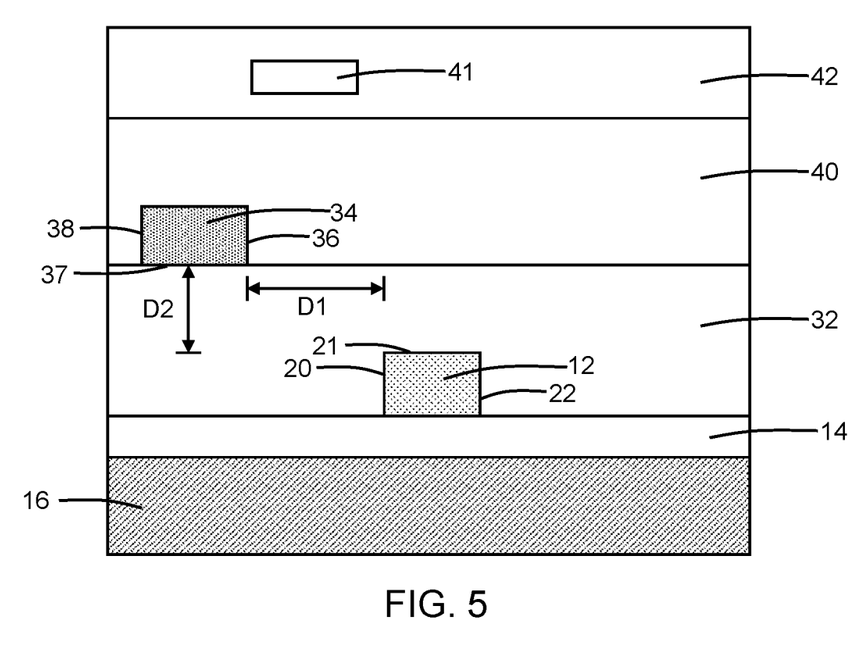
FIG. 5 is a cross-sectional view of the structure at a fabrication stage of the processing method subsequent to FIG. 4.

With reference to FIG. 5 in which like reference numerals refer to like features in FIG. 4 and at a subsequent fabrication stage, a dielectric layer 40 is formed over the waveguide core 34. The dielectric layer 40 may be comprised of a dielectric material, such as silicon dioxide, that provides low-index cladding. The thickness of the dielectric layer 40 may be greater than the thickness of the waveguide core 34 such that the waveguide core 34 is embedded in the dielectric layer 40.

A back-end-of-line stack 42 may be formed by back-end-of-line processing over the dielectric layer 40. The back-end-of-line stack 42 may include one or more interlayer dielectric layers comprised of one or more dielectric materials, such as a silicon dioxide. In an alternative embodiment, a heater 41 may be provided in the back-end-of-line stack 42 and used to tune the filtering provided by the structure 10.

The structure 10, in any of its embodiments described herein, may be integrated into a photonics chip that includes electronic components and additional optical components in addition to the structure 10. The electronic components may include, for example, field-effect transistors that are fabricated by complementary-metal-oxide-semiconductor (CMOS) processing using the device layer of the silicon-on-insulator substrate. The back-end-of-line stack 42 may include metal lines, vias, and contacts that are connected to the field-effect transistors and electrically-active optical components.

In use as a filter stage in a demultiplexer, light may be evanescently coupled from the waveguide core 34 to the sections 24, 26 of the waveguide core 12. Evanescent coupling occurs in a lateral direction and in a vertical direction due to the orthogonal offsets D1, D2 between the waveguide core 12 and the waveguide core 34. The structure 10 is designed to operate based on contra-directional reflection, which may be characterized by low back reflection. The contra-directional reflection is generally induced by the periodic corrugation of the projections 28, 30 acting on the light in the waveguide core 34 to produce evanescent coupling in which the light transferred to the waveguide core 12 propagates in an opposite direction (i.e., backward propagation) to the direction of the light propagating in the waveguide core 34. Alternatively, in use as a filter stage in a multiplexer, light may be evanescently coupled from the sections 24, 26 of the waveguide core 12 to the waveguide core 34.

The structure 10 leverages the waveguide cores 12, 34 containing different materials and placed in different levels (in elevation) to increase the handling of optical power in a stage of a wavelength division multiplexing filter by, for example, reducing non-linear power-dependent loss in comparison with a conventional all-silicon wavelength division multiplexing filter. The structure 10 may exhibit reduced optical leakage loss in comparison with a conventional all-silicon wavelength division multiplexing filter. The structure 10 may exhibit increased optical confinement in comparison with a conventional all-silicon wavelength division multiplexing filter, which may contribute to a reduced footprint and a higher efficiency. The structure 10 may provide more flexibility in optimizing coupling and may exhibit an improved optical performance, such as channel broadening and extended operational wavelength, in comparison with a conventional all-silicon wavelength division multiplexing filter. The structure 10 may be operable for light with either transverse electric (TE) polarization or transverse magnetic (TM) polarization, although the structure 10 may particularly support better-confined TM modes with moderate loss in comparison with a conventional all-silicon wavelength division multiplexing filter.

Figure 6:
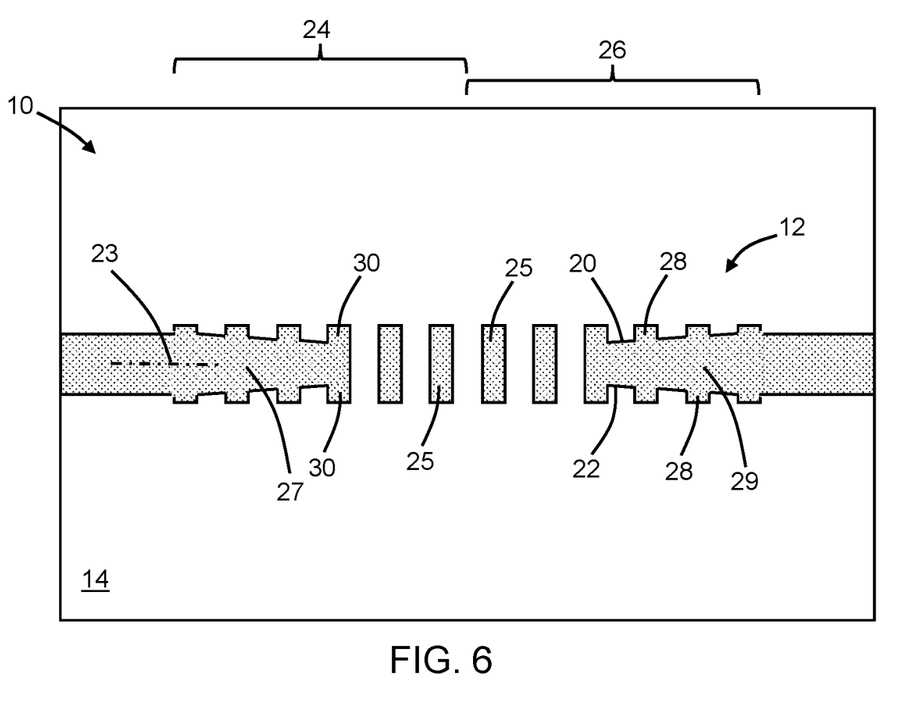
FIG. 6 is a top view of a structure in accordance with alternative embodiments of the invention.

With reference to FIG. 6 in which like reference numerals refer to like features in FIG. 1 and in accordance with alternative embodiments, the waveguide core 12 may be modified to add segments 25 that are positioned along the longitudinal axis 23 between the section 24 and the section 26. The segments 25 constitute discrete pegs that are distributed with a spaced arrangement along the longitudinal axis 23. Adjacent pair of segments 25 are separated by gaps that are filled by dielectric material following the deposition of the dielectric layer 32. The segments 25 may have the same or substantially the same width dimension and pitch as the portions of the section 24 that include the projections 28 and as the portions of the section 26 that include the projections 30.

Figure 7:
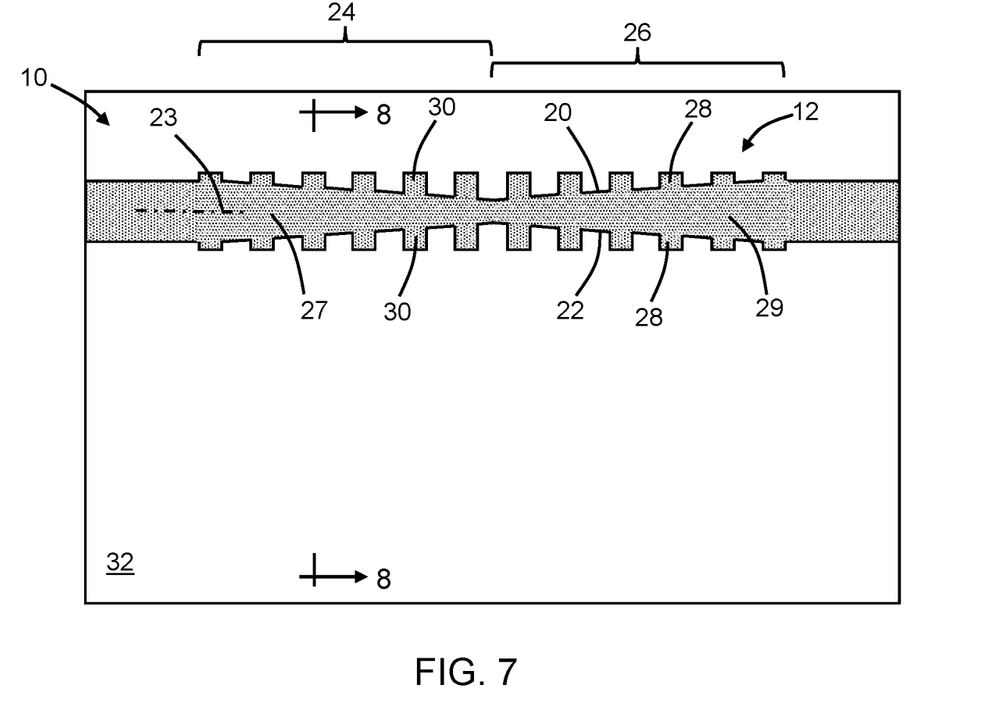
FIG. 7 is a top view of a structure in accordance with alternative embodiments of the invention.
Figure 8:
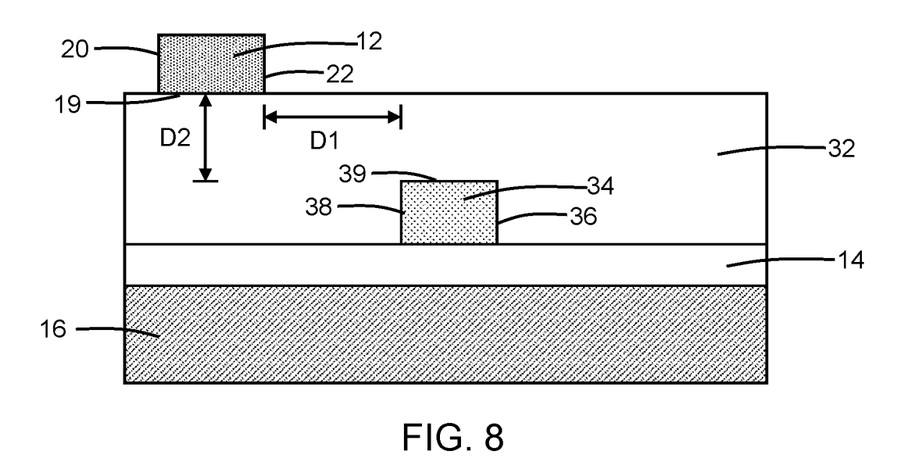
FIG. 8 is a cross-sectional view of the structure taken generally along line 8-8 in FIG. 7.

With reference to FIGS. 7, 8 in which like reference numerals refer to like features in FIG. 4 and in accordance with alternative embodiments, the waveguide core 12 may be formed from dielectric material (e.g., silicon nitride) instead of semiconductor material and positioned on the dielectric layer 32. In conjunction with this change, the waveguide core 36 may be formed from semiconductor material (e.g., silicon) and positioned on the dielectric layer 14. The modification effectively swaps the locations of the grating and the bus waveguide in the structure 10. The lateral offset D1 may be measured between the sidewall 38 of the waveguide core 34 that is closest to the sidewall 22 of the waveguide core 12. The vertical offset D2 may be measured between a bottom surface 19 of the waveguide core 12 and a top surface 39 of the waveguide core 34.

Figure 9:
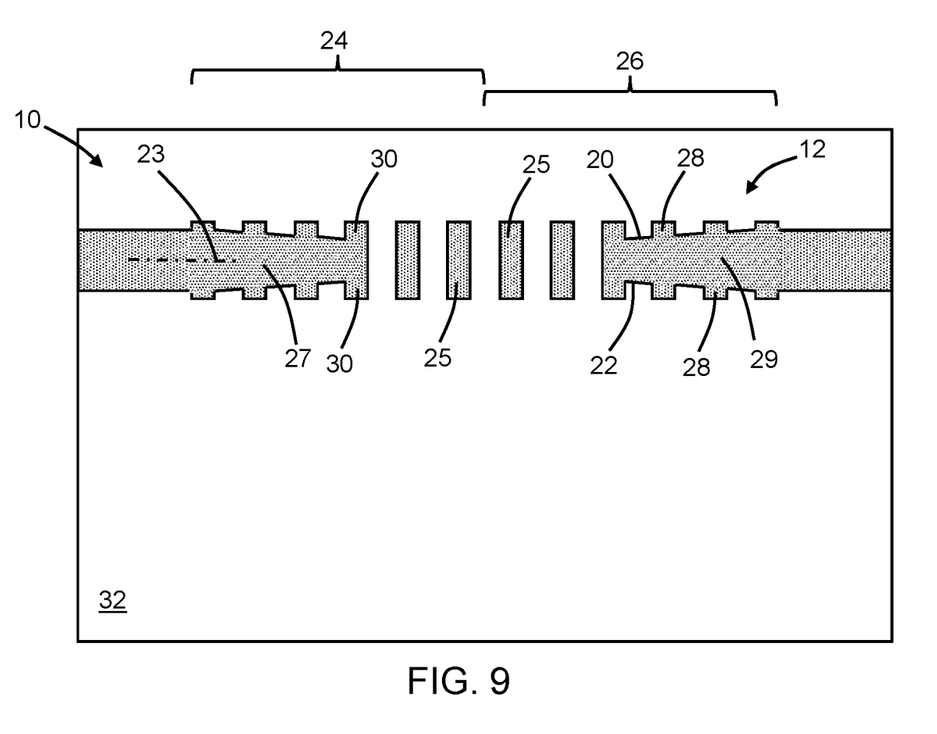
FIG. 9 is a top view of a structure in accordance with alternative embodiments of the invention.

With reference to FIG. 9 in which like reference numerals refer to like features in FIG. 7 and in accordance with alternative embodiments, the waveguide core 12 may be modified to include segments 25 that are positioned along the longitudinal axis 23 between the section 24 and the section 26. The segments 25 are also formed from dielectric material (e.g., silicon nitride).

Figure 10:
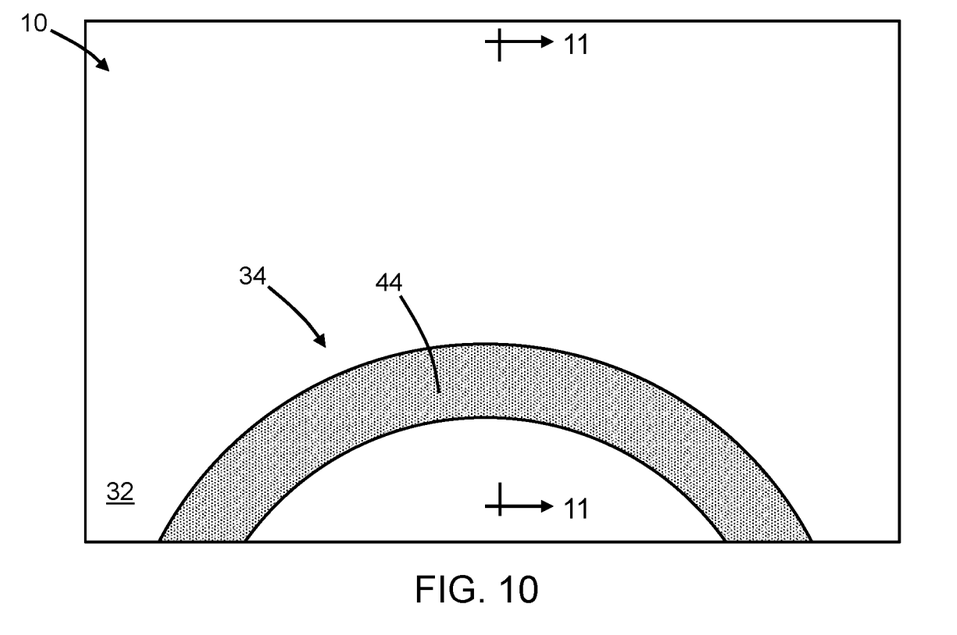
FIG. 10 is a top view of a structure in accordance with alternative embodiments of the invention.
Figure 11:
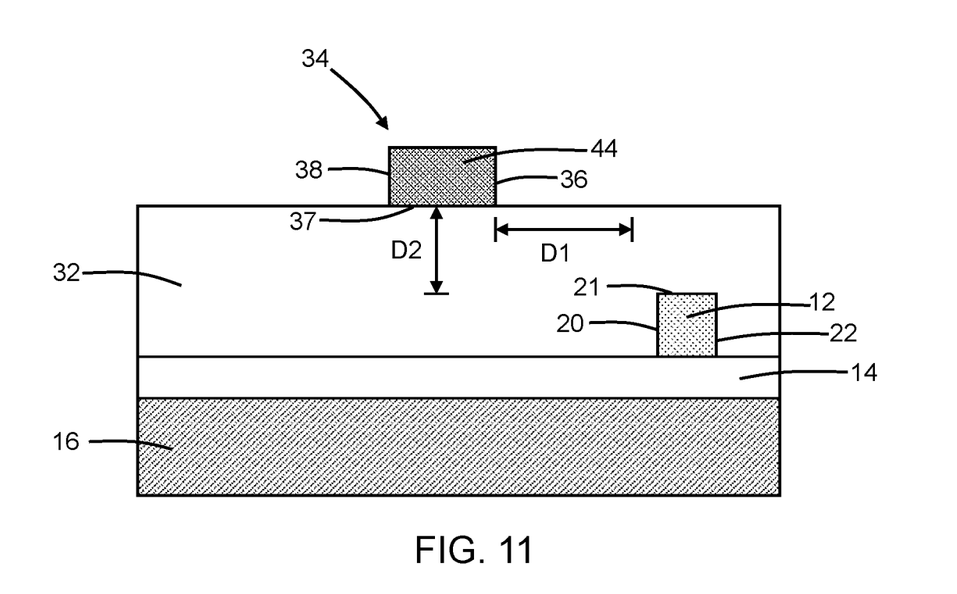
FIG. 11 is a cross-sectional view of the structure taken generally along line 11-11 in FIG. 10.

With reference to FIGS. 10, 11 in which like reference numerals refer to like features in FIGS. 3, 4 and in accordance with alternative embodiments, the waveguide core 34 may include a bend 44 with a curved shape that is positioned adjacent to the sections 24, 26 of the waveguide core 12. The bend 44 may be separated from the waveguide core 12 by a minimum lateral offset D1 at the transition between the sections 24 and the section 26 such that the bend 44 is centered relative to the sections 24, 26.

In alternative embodiments, the waveguide core 34 with the bend 44 may be arranged adjacent to the waveguide core 12 of FIG. 6, 7, or 9. In an alternative embodiment, the waveguide core 34 with the bend 44 may be comprised of semiconductor material and be arranged adjacent to the waveguide core 12 of FIG. 8.

Figure 12:
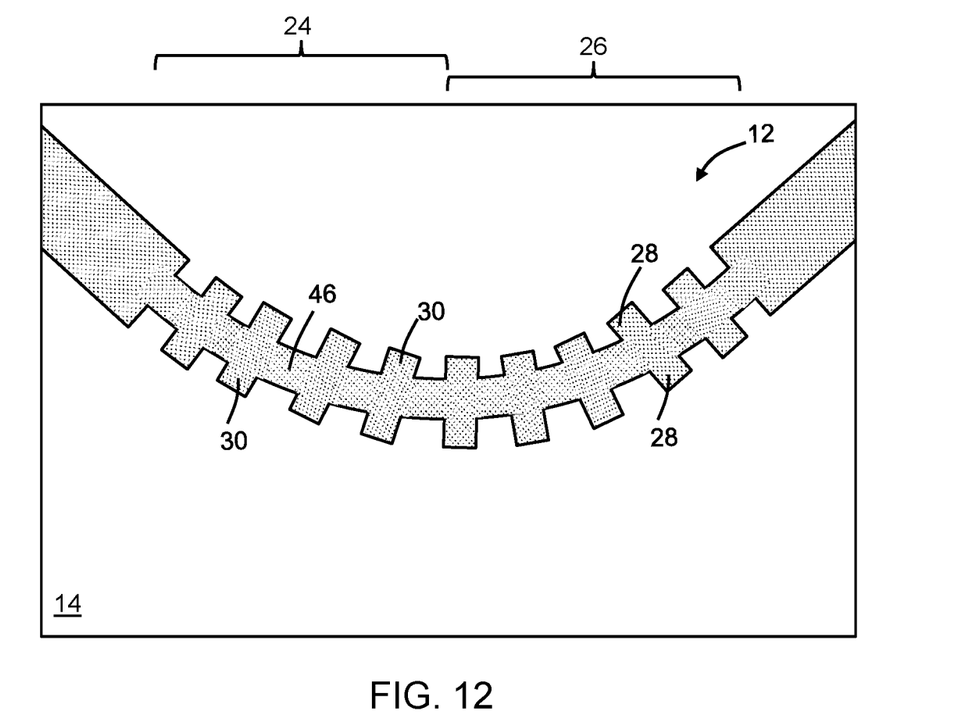
FIG. 12 is a cross-sectional view of a structure in accordance with alternative embodiments of the invention.

With reference to FIG. 12 in which like reference numerals refer to like features in FIG. 1 and in accordance with alternative embodiments, the sections 24, 26 of the waveguide core 12 may be arranged in a bend 46, and the projections 28, 30 in both sections 24, 26 of the waveguide core 12 may have a spaced arrangement along the bend 46. In the representative embodiment, the waveguide core 12 is not tapered in either of the sections 24, 26. In an alternative embodiment, the waveguide core 12 may be tapered in both of the sections 24, 26. The waveguide core 12 may be paired with the subsequently-formed waveguide core 34 of FIG. 1 or the subsequently-formed waveguide core 34 of FIG. 10 that includes the bend 44.

Figure 13:
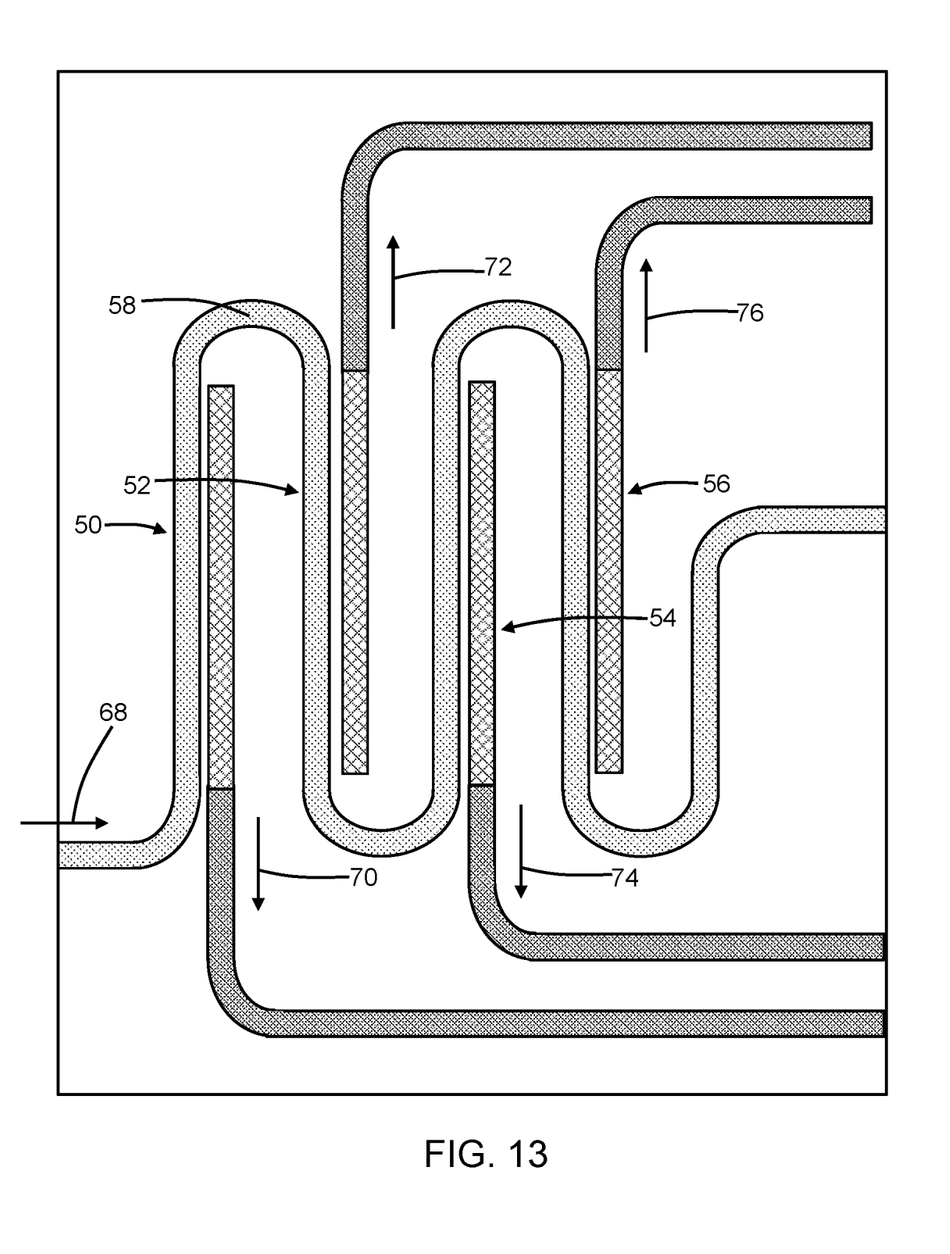
FIG. 13 is a top view of a demultiplexing filter in accordance with alternative embodiments of the invention.

With reference to FIG. 13 and in accordance with alternative embodiments, multiple instances 50, 52, 54, 56 of the structure 10 may connected by a bus waveguide core 58 to define the channels of a demultiplexer. For example, the pitch and duty cycle of the projections 28 and/or the projections 30 of each of the instances 50, 52, 54, 56 may be altered to target a specific wavelength band $\Delta\lambda$ such that evanescent coupling is optimized for the specific wavelength band. The instances 50, 52, 54, 56 may be configured as any of the embodiments of the structure 10 that are disclosed herein. The demultiplexer may include any number of channels by stringing together a corresponding number of instances of the structure 10 as filters. The demultiplexer may provide either coarse wavelength-dependent multiplexing or dense wavelength-dependent multiplexing.

In use, light (e.g., laser light) containing mixed optical signals 68 of different wavelengths (e.g., optical signals 68 of four different wavelength bands $\Delta\lambda 1$, $\Delta\lambda 2$, $\Delta\lambda 3$, $\Delta\lambda 4$) may be guided on the photonics chip by a waveguide core 58 to the connected instances of the structure 10. For example, the different peak wavelengths and wavelength bands of the arriving light may lie in the near infrared portion (e.g., 850 nm-1650 nm) of the electromagnetic spectrum. The demultiplexer may divide the mixed optical signals 68 according to wavelength, and the divided optical signals 70, 72, 74, 76 of different wavelength bands may separately exit the demultiplexer. In an initial stage of the demultiplexer provided by the instance 50, optical power for optical signals 70 in a wavelength band (e.g., $\Delta\lambda1$) may be separated from the optical signals 68. In a subsequent stage of the demultiplexer provided by the instance 52, optical power for optical signals 72 in a different wavelength band (e.g., $\Delta\lambda2$) may be separated from the optical signals 68. In a subsequent stage of the demultiplexer provided by the instance 54, optical power for optical signals 74 in a different wavelength band (e.g., $\Delta\lambda3$) may be separated from the optical signals 68. In a subsequent stage of the demultiplexer provided by the instance 56, optical power for optical signals 76 in a different wavelength band (e.g., $\Delta\lambda4$) may be separated from the optical signals 68.

The utilization of the structure 10 in the demultiplexer may reduce the thermal sensitivity of the demultiplexing filter due to the incorporation of a dielectric material (e.g., silicon nitride) having a refractive index that is less sensitive to temperature changes than silicon.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present. Different features may overlap if a feature extends over, and covers a part of, another feature with either direct contact or indirect contact.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure for a wavelength division multiplexing filter, the structure comprising:
   a first waveguide core including a first section, a second section, and a first longitudinal axis, the first section and the second section each having a first notched sidewall and a second notched sidewall opposite to the first notched sidewall, the first section of the first waveguide core including a first taper and a first plurality of projections that project outwardly from the first taper transverse to the first longitudinal axis, and the second section of the first waveguide core including a second taper and a second plurality of projections that project outwardly from the second taper transverse to the first longitudinal axis; and
   a second waveguide core positioned with a first offset in a first direction relative to the first section and the second section of the first waveguide core and with a second offset in a second direction relative to the first section and the second section of the first waveguide core, the second direction transverse to the first direction.

2. The structure of claim 1 further comprising:
   a plurality of segments positioned with a spaced arrangement between the first section and the second section of the first waveguide core.

3. The structure of claim 1 wherein the first waveguide core comprises a semiconductor material, and the second waveguide core comprises a dielectric material.

4. The structure of claim 1 wherein the first waveguide core comprises a dielectric material, and the second waveguide core comprises a semiconductor material.

5. The structure of claim 1 wherein the second waveguide core includes a bend that is positioned adjacent to the first section and the second section of the first waveguide core.

6. The structure of claim 1 wherein the first section and the second section of the first waveguide core are arranged in a first bend, and the first bend is positioned adjacent to the second waveguide core.

7. The structure of claim 6 wherein the second waveguide core includes a second bend that is positioned adjacent to the first bend of the first waveguide core.

8. The structure of claim 1 wherein the first taper is adjoined to the second taper, and the first taper and the second taper narrow in opposite directions along the first longitudinal axis.

9. The structure of claim 1 further comprising:
   a plurality of segments positioned with a spaced arrangement along the first longitudinal axis between the first section and the second section of the first waveguide core.

10. The structure of claim 1 further comprising:
    a first dielectric layer arranged to separate the first waveguide core from the second waveguide core.

11. The structure of claim 10 wherein the first waveguide core is embedded in the first dielectric layer.

12. The structure of claim 10 further comprising:
a second dielectric layer,
wherein the first waveguide core is positioned between the first dielectric layer and the second dielectric layer.

13. The structure of claim 10 further comprising:
a second dielectric layer,
wherein the second waveguide core is positioned on the second dielectric layer.

14. The structure of claim 1 wherein the second waveguide core includes a sidewall that is disposed relative to the first notched sidewall of the first section of the first waveguide core with the first offset.

15. The structure of claim 1 wherein the second waveguide core includes a sidewall that is disposed relative to the first notched sidewall of the second section of the first waveguide core with the first offset.

16. The structure of claim 1 wherein the first waveguide core includes a top surface, and the second waveguide core includes a bottom surface that is disposed relative to the top surface of the first waveguide core with the second offset.

17. The structure of claim 1 wherein the second waveguide core has a second longitudinal axis that is aligned parallel to the first longitudinal axis of the first waveguide core.

18. A method of forming a structure for a wavelength division multiplexing filter, the method comprising:
forming a first waveguide core including a first section and a second section, wherein the first section and the second section each have a first notched sidewall and a second notched sidewall opposite to the first notched sidewall; and
forming a second waveguide core positioned with a first offset in a first direction relative to the first section and the second section of the first waveguide core and with a second offset in a second direction relative to the first section and the second section of the first waveguide core, wherein the second direction is transverse to the first direction,
wherein the first waveguide core has a longitudinal axis, the first section of the first waveguide core includes a first taper and a first plurality of projections that project outwardly from the first taper transverse to the longitudinal axis, the second section of the second waveguide core includes a second taper and a second plurality of projections that project outwardly from the second taper transverse to the longitudinal axis, the first taper is adjoined to the second taper, and the first taper and the second taper narrow in opposite directions along the longitudinal axis.

19. The method of claim 18 wherein the first waveguide core is formed by patterning a layer comprised of a dielectric material.

20. The method of claim 18 wherein the first waveguide core is formed by patterning a layer comprised of a semiconductor material.

* * * * *